(12) United States Patent
Clowe

(10) Patent No.: US 11,822,638 B1
(45) Date of Patent: Nov. 21, 2023

(54) MULTI-CHANNEL AUTHENTICATION USING SMART CARDS

(71) Applicant: United Services Automobile Association (USAA), San Antonio, TX (US)

(72) Inventor: John R. Clowe, Selma, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 17/828,968

(22) Filed: May 31, 2022

Related U.S. Application Data

(63) Continuation of application No. 16/591,301, filed on Oct. 2, 2019, now Pat. No. 11,372,958.

(60) Provisional application No. 62/741,459, filed on Oct. 4, 2018.

(51) Int. Cl.
G06F 21/00 (2013.01)
G06F 21/34 (2013.01)
G06F 21/33 (2013.01)

(52) U.S. Cl.
CPC .............. *G06F 21/34* (2013.01); *G06F 21/33* (2013.01)

(58) Field of Classification Search
CPC ................................. G06F 21/34; G06F 21/33
See application file for complete search history.

(56) References Cited

U.S. PATENT DOCUMENTS

| | | | |
|---|---|---|---|
| 7,269,732 B2 | 9/2007 | Kilian-Kehr | |
| 8,015,205 B2* | 9/2011 | Barrett | G06Q 40/00 726/13 |
| 8,789,753 B1 | 7/2014 | de Jong | |
| 9,928,671 B2* | 3/2018 | Jelavic | G06F 21/32 |
| 10,303,869 B1* | 5/2019 | Duke | G06F 21/36 |
| 10,686,600 B1* | 6/2020 | Vo | H04L 63/105 |
| 11,372,958 B1 | 6/2022 | Clowe | |
| 2004/0083380 A1 | 4/2004 | Janke | |
| 2007/0220614 A1 | 9/2007 | Ellis et al. | |
| 2007/0278291 A1* | 12/2007 | Rans | G06F 21/31 235/492 |
| 2015/0006374 A1* | 1/2015 | Hasegawa | G06Q 20/341 705/40 |
| 2015/0100485 A1* | 4/2015 | Skliar | G06Q 20/40145 705/41 |
| 2015/0332266 A1 | 11/2015 | Friedlander et al. | |
| 2016/0005032 A1 | 1/2016 | Yau et al. | |
| 2016/0050324 A1 | 2/2016 | Ohshita et al. | |
| 2017/0061112 A1* | 3/2017 | Bandyopadhyay | H04L 63/0853 |
| 2017/0242428 A1* | 8/2017 | Pal | H04W 12/06 |
| 2019/0034910 A1 | 1/2019 | Gardner et al. | |

(Continued)

*Primary Examiner* — Ka Shan Choy

(74) *Attorney, Agent, or Firm* — Potomac Law Group, PLLC

(57) ABSTRACT

Embodiments described herein disclose technology for authenticating a user. In some embodiments, a smart card or other similar authentication device can be associated with a user profile. When a request to interact is received via an application associated with a device, the system prompts the user to waive the smart card within a threshold proximity of the device. In response to the smart card being placed within the proximity, the system collects information from the smart card and verifies that the smart card is associated with the user profile of the user. In response to verifying the information from the smart card, the system authenticates the user and allows the user to interact.

20 Claims, 5 Drawing Sheets

(56) References Cited

U.S. PATENT DOCUMENTS

2019/0278893 A1* 9/2019 Eisen .................. G06F 21/36
2020/0019725 A1* 1/2020 Rule .................. G06K 19/0723

* cited by examiner

MULTI-CHANNEL AUTHENTICATION USING SMART CARDS

CROSS-REFERENCE TO RELATED APPLICATIONS

This application is a continuation of U.S. patent application Ser. No. 16/591,301, filed on Oct. 2, 2019, entitled "MULTI-CHANNEL AUTHENTICATION USING SMART CARDS," which is a non-provisional of and claims priority to U.S. Provisional Application No. 62/741,459, filed on Oct. 4, 2018, entitled "MULTI-CHANNEL AUTHENTICATION USING SMART CARDS," both of which are hereby incorporated by reference in their entireties for all purposes.

BACKGROUND

Account takeovers are prevalent due in part to mass data breaches and phishing attacks exposing billions of email addresses, usernames and passwords in the past few years. Additionally, many people use the same username/password combination across multiple accounts, which makes it easy for cybercriminals to sell stolen credentials. Service providers attempt to curtail fraudulent activity by collecting and using information such as a username and password or in some cases requiring mufti-factor authentication to authenticate the user. However, these techniques have limitations using current systems.

Figure 1:
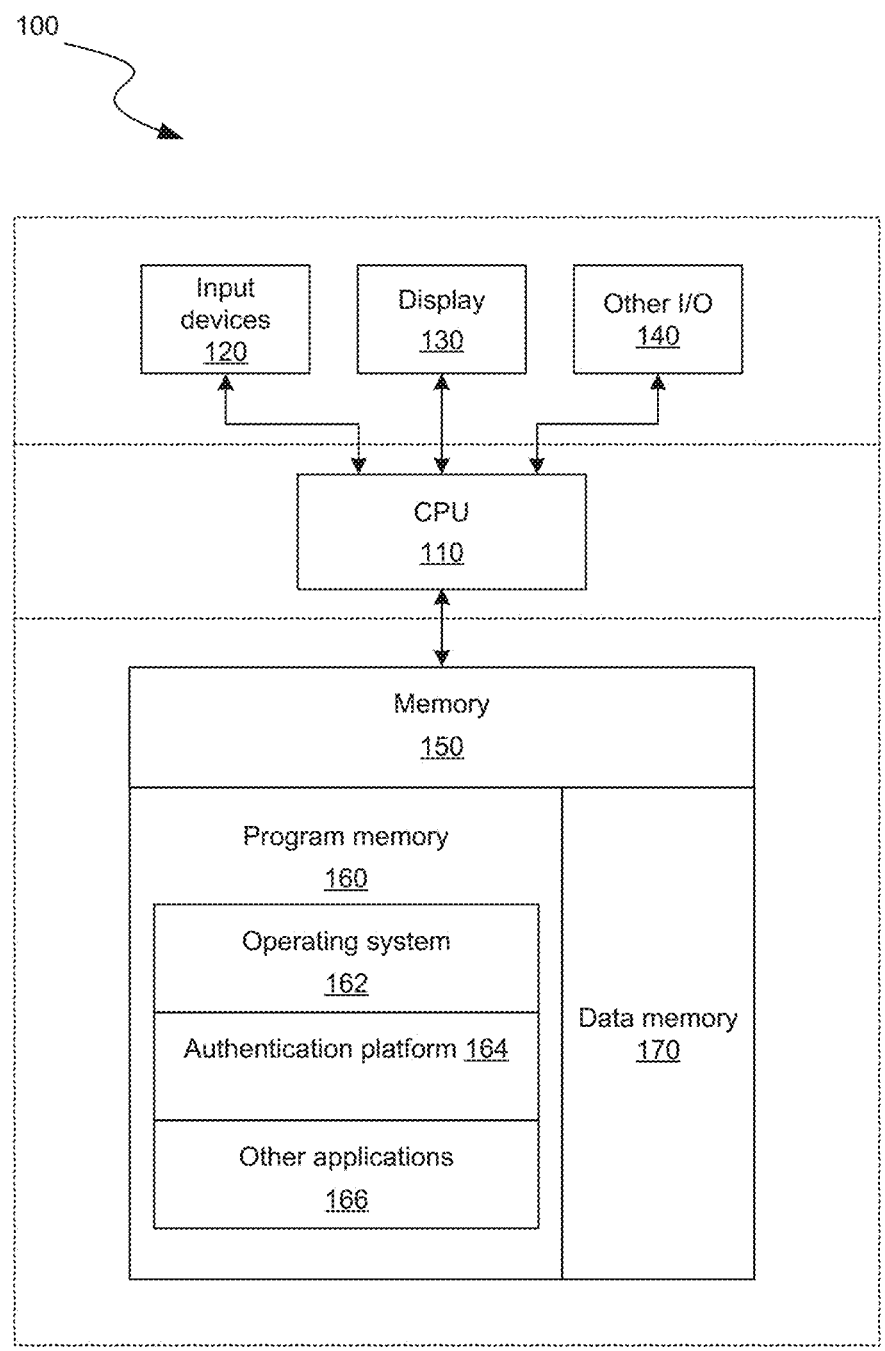
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Multi-factor authentication (i.e., the user is authenticated only after successfully presenting two or more pieces of evidence to an authentication mechanism: knowledge (something the user and only the user knows), possession (something the user and only the user has), and inherence (something the user and only the user is)) is becoming standard in authentication due to the prevalence of account takeovers. Multi-channel authentication is a method of multi-factor authentication where one or more of the authentication factors involved are communicated over separate communication channels or protocols. One way to allow users to obtain multi-channel authentication is by using a one-time password ("OTP") token which is a hardware device capable of generating one-time passwords. More advanced hardware tokens use microprocessor-based smart cards to calculate one-time passwords. Smart cards can also include additional strong authentication capabilities such as or Public Key Infrastructure ('PKI") certificates. When used for PKI applications, the smart card device can provide core PKI services, including encryption, digital signature and private key generation and storage.

In existing systems, to use the hardware token, the user checks the hardware token and enters the OTP with other identity credentials (typically username and password) and an authentication server validates the request. In some cases, the hardware token can be inserted into a device and a OTP can be directly sent to an authentication server. Although this is a proven solution for enterprise applications, the deployment cost can make the solution inconvenient and expensive for consumer applications. Additionally, having to type in an OTP each time the user wants to access an application or input a hardware token into a user device such as mobile phone is burdensome. Moreover, requiring the user to carry a separate hardware token with no other use than authentication can also be problematic.

To address the above-mentioned issues, the technology described herein provides a system and method that allows a user to be authenticated using multiple channels without requiring the user to enter a OTP or carry a hardware token dedicated to generating OTPs. In some embodiments, a smart card is embedded into a medium such as a payment card (e.g., credit card, debit card) or membership card. When the user receives the smart card, the user registers the smart card with the system by providing identity and/or authentication (e.g., username, password, PIN) to the system (e.g., via an application) and by holding the smart card within a proximity of the user's device. The proximity is determined by the type of protocol being used to communicate information from the smart card to the device. The system collects (e.g., using RFID) information that can be used to verify OTPs generated by the smart card (e.g., digital certificate) and associated with the user profile, device, and smart card. When the smart card is embedded in a payment card, registering the smart card can accomplish two tasks simultaneously: (1) activating the payment card so it can be used to make purchases and (2) activating the smart card as an authentication device that can be used to authenticate the user for activities (e.g., access to a bank account, access to make an in-application call).

When the user requests an interaction with the entity (e.g., by accessing the application, viewing bank accounts, requesting a transaction, filing a claim, making a call, making an in-application call), after the system identifies the user (e.g., by collecting identifying information from the user or from the device), the system prompts the user to hold the smart card within a proximity of the user's device. The smart card generates the OTP or other information and communicates the information to the device and the device via the application sends the information to the system for verification. In some embodiments, verification occurs locally on the device. Using the digital certificate or other information previously collected by the system and associated with the user profile, the system can verify that the smart card is or is not associated with the user and/or the device. The system can either allow the user to interact, request for information or deny the request based on verification of the OTP and business rules. In some embodiments, the user is asked to provide additional authentication such as a PIN for further authentication.

The smart card can be associated with more than one device associated with the user using the same or similar registration process. In some implementations, the device is a smartphone, tablet, laptop, smartwatch, or voice-controlled personal assistant.

Embedding a smart card into a payment card is beneficial because people typically carry a payment card with them. Additionally, payment cards are typically expire after five years, which is about the same shelf life of many smart cards, providing a convenient timeframe in which to replace both simultaneously. That being said, the smart card can be embedded in other mediums such as a membership card, vehicle keys, driver's license, or body of a person.

This disclosure describes systems and processes designed to authenticate users wanting to interact with an entity, Various embodiments may provide one or more of the following technological improvements; (1) increase security by authenticating a user to an application using multi-channel authentication without requiring the user to type a OTP or physically connect a hardware token to the user's device; (2) increase efficiency of registration by embedding the smart card into a medium that is typically registered with an organization; and (3) reduce account takeovers by requiring use of a smart card for authentication.

In the following description, for the purposes of explanation, numerous specific details are set forth in order to provide a thorough understanding of embodiments of the present technology. It will be apparent, however, that embodiments of the present technology may be practiced without some of these specific details.

Suitable System

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that manage information access. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: a LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, authentication platform 164, and other application programs 166. A memory 150 can also include data memory 170 that can include user identifying information (e.g., addresses, usernames, passwords, personal identification numbers), device characteristics, digital certificates, historical information regarding use of an instance of an application, web browsing history, and other information which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the Ike.

Figure 2:
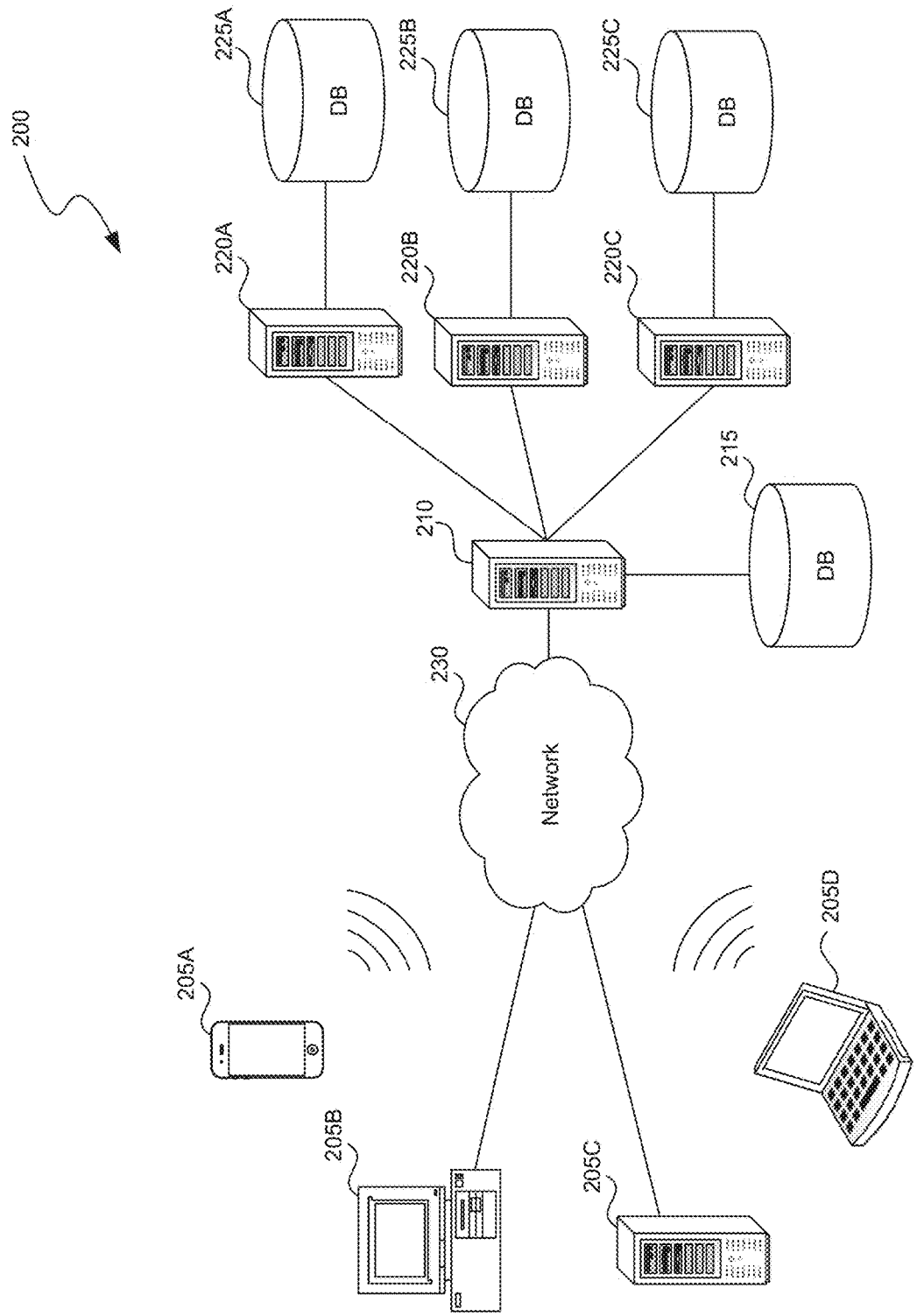
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as identifying information, historical OTPs, browsing history, transactions or other activity made via an application. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
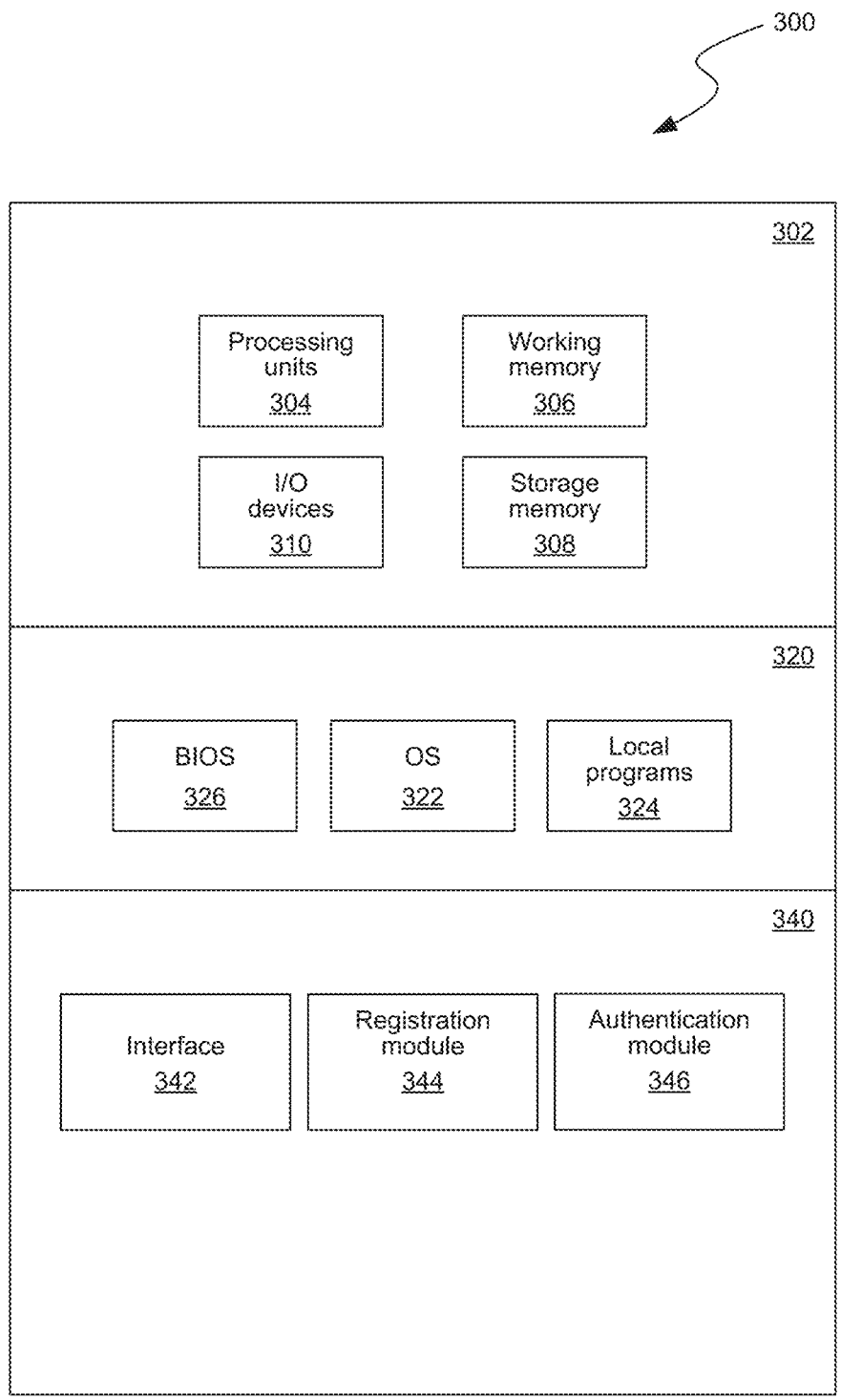
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include registration module 344, authentication module 346 and components that can be used for transferring data and controlling the specialized components, such as interface 342. In some implementations, components 300 can be in a computing system that is distributed across multiple computing devices or can be an interface to a server-based application executing one or more of specialized components 340.

Registration module 344 receives a request to register a smart card. Registering the smart card can activate the smart card for use and can associate a digital certificate or other encryption mechanism with the smart card, the user profile, an instance of an application, and/or the device. The request to register the smart card can be received via any channel (e.g., an application, a phone call). Upon contacting the organization and providing authentication information (e.g., PIN, username/password, biometrics), registration module 344 can ask the user to bring/hold/place/swipe/put the smart card within a threshold proximity of the device. Using a communication protocol such as NFC, the smart card can share specific information with the application such as a digital certificate. Registration module 344 can associate the digital certificate with one or more of the smart card, the user profile, an instance of an application, and/or the device.

In some implementations, the smart card can be associated with more than one device associated with the user. For example, the same smart card can be associated with a smartphone, a tablet, and a voice-controlled personal assistant (e.g., Amazon Echo). The user can follow a similar registration process for each device in which the smart card is associated.

In some embodiments, the smart card is embedded in a payment card (e.g., credit card, debit card). When users receive new payment cards in the mail, they are typically required to activate the card before use. For example, the user can call into an organization and provide the payment card number to activate the payment card. Registration of the smart card can occur at the same time. For example, the automated system or representative can instruct the user to open their application and waive the smart card within a proximity of the device to complete the registration process. In other embodiments, if the device is a voice-controlled personal assistant device, the user can authenticate using voice or speaking a username/password or PIN and then waive the smart card within a proximity of the device.

Authentication module 346 can receive a request to engage in an activity with an organization or otherwise interact with an organization. An activity can include accessing the application, checking a bank account statement, transferring funds, checking the status of an insurance claim, applying for a loan, making a call (in-application or typical), or other activities. The user can launch an application and provide some identifying information (e.g., username). In some embodiments, the user also provides a PIN, password, biometric or other verification information. Authentication module 346 and/or/via the application can prompt the user to waive the smart card within a proximity of the device. The proximity is determined by the type of communication protocol used. When the user brings the smart card within the proximity of the device, the smart card provides information (e.g., OTP) to the device to send via the application to authentication module 346. Authentication module 346 verifies that the information received from the application is associated with the device and the user profile using the digital certificate. In one example, authentication module 346 validates the OTP by using the same algorithm that the smart card used to generate the OTP. Thus, the OTP can be checked so long as authentication module 346 uses the digital certificate of the user's smart card. In response to verifying that the smart card is associated with the user profile, authentication module 346 authenticates the user and allows the user to engage in the activity. In some embodiments, before or after the smart card is verified, the user is asked to provide additional authentication such as a PIN, password, or biometric.

Providing the digital certificate via the smart card provides additional security for the user because the user is required to have a physical object in his or her possession. Thus, in some implementations, the user is only asked to provide the smart card when the user is requesting to engage in certain activities or interact in a certain way (e.g., if the user is requesting a risky transaction such as one involving a large sum of money). Or, the user can be asked to provide the smart card when triggered, for example, during a random check, when other authentication factors are out of the normal (e.g., location is different, outside of a geofenced area, suspicious behavior such as accessing the application or requesting a transaction at an irregular time for the user, receiving abnormal vital signs or health indicators from a wearable). In some implementations, proximity to the smart card can be checked each time the user wishes to engage in an activity. Depending on the level of authentication required for the activity (e.g., if the level of authentication is above a threshold) or if other authentication factors are out of the normal (e.g., health indicators from a wearable), the user could be asked to provide additional authentication such as a PIN.

Figure 4:
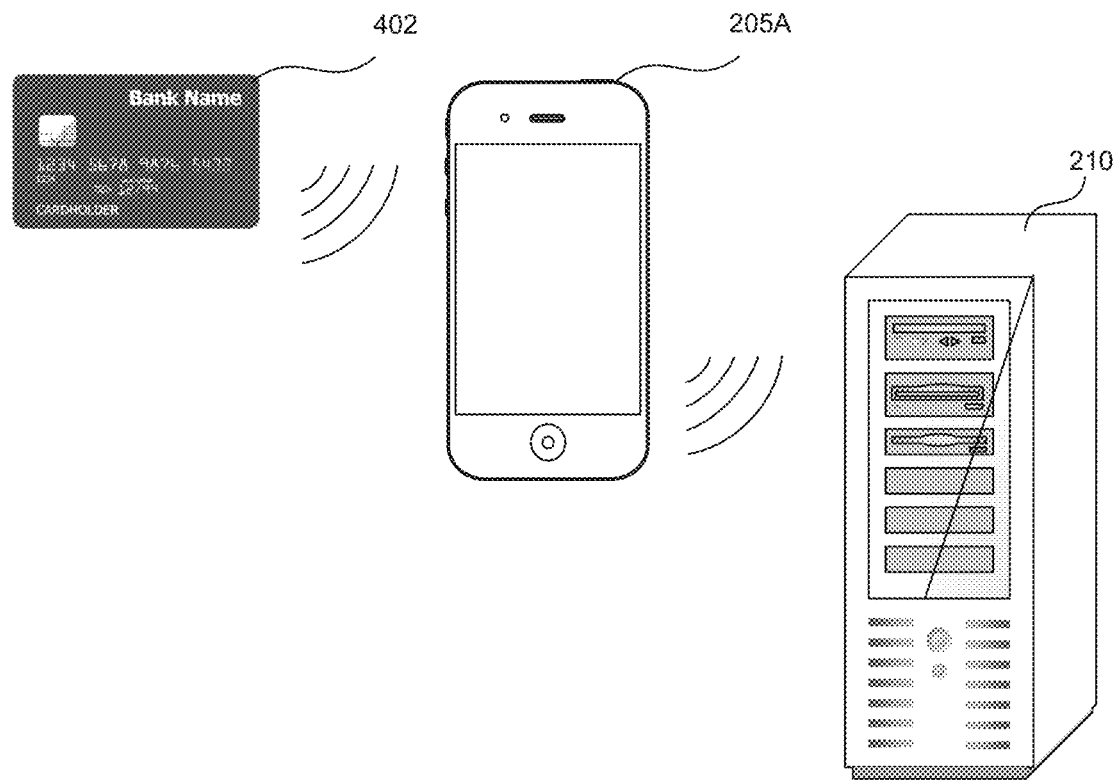
FIG. 4 is a diagram showing the interaction between smart card embedded in a payment card, mobile device, and server.

FIG. 4 is a diagram showing the interaction between the smart card embedded in a payment card, mobile device, and server. As shown, smart card 402 communicates with device 205A through a network using for example NFC and device 205A communicates with server 210 via another network.

Those skilled in the art will appreciate that the components illustrated in FIGS. 1-4 described above, and in each of the flow diagrams discussed below, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Figure 5:
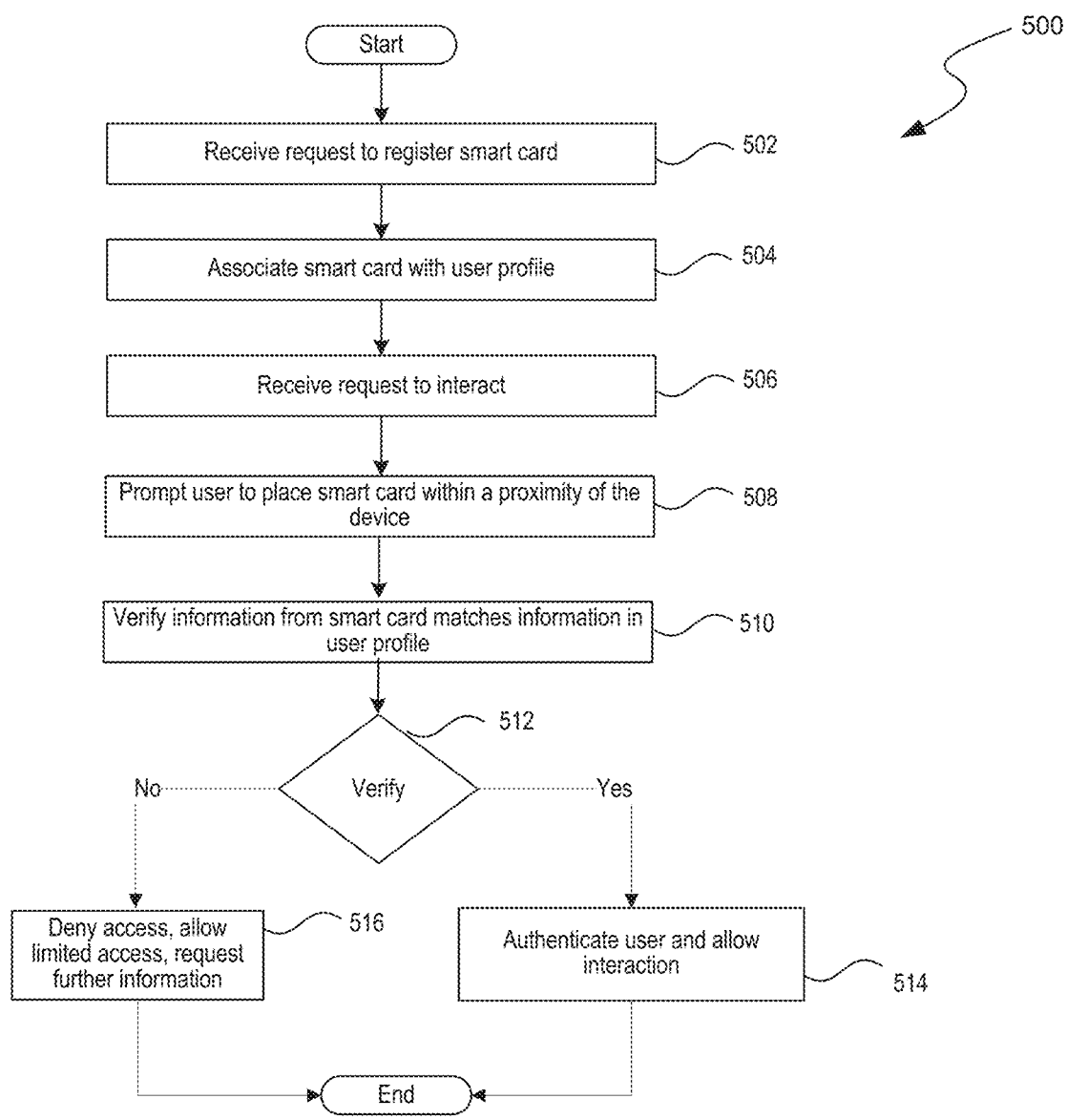
FIG. 5 is a flow diagram illustrating a process for authenticating a user using a smart card.

FIG. 5 is a flow diagram illustrating a process 500 for authenticating a user with a smart card. Receiving operation 502 receives a request to register a smart card with a user. In some implementations, the user can request registration and be asked to provide identifying information via an application (e.g., username), In some embodiments, the user can be identified from device characteristics. The user can be prompted to bring the smart card within a threshold proximity of the device so that the system can collect information from the smart card such as a digital certificate. Associating operation 504 can associate the smart card with the user profile by including the information from the smart card in the user profile.

Receiving operation 506 can receive a request from the user to interact with the organization. For example, the user can request to access the application or certain information in the application (e.g., sensitive information), conduct a transaction, view a bank account, file an insurance claim, check health records, pay a bill, or other activities. Prompting operation 508 prompts the user to place the smart card within a proximity of the device. The proximity can be determined by the communication protocol being used (e.g., if NFC is used, the user must place the smart card within inches of the device). The prompt can be sent via push notification, text message, in-application notification, phone call or other messaging service. Verifying operation 510 verifies the information collected from smart card matches the information in the user's profile (e.g., OTP can be checked using the digital certificate to generate the OTP).

Decision operation 512 determines whether the information collected via the smart card matches or is otherwise verified with the information in the user's profile. If the information can be verified, decision operation 512 branches to authenticating operation 514, where the system authenticates the user and allows the user to interact with the entity. In some embodiments, the user is asked to provide a PIN or other additional information to provide additional authentication. If the information cannot be verified, decision operation 512 branches to denying operation 516 where the user is either denied access, provided limited access to information, or asked for additional information.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application, Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communication links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology, Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A computerized method comprising:
   receiving, via an application installed on a device associated with a user, a request to engage in an activity;
   after receiving the request, initiating, by a process, a random authentication check;
   detecting, during the initiated random authentication check, a trigger based on one or more parameters of the activity being outside of a normal range for the user, wherein the trigger is detected using information received from a wearable device associated with the user, and the detected trigger causes a possession check for possession of a smart card associated with a user profile;
   in response to detecting the trigger, prompting the user to place the smart card within a threshold proximity of the device; and
   in response to the smart card being detected within the threshold proximity of the device, allowing the user to engage in the activity.

2. The computerized method of claim 1, further comprising:
   determining a level of authentication required for the activity; and
   in response to the level of authentication required for the activity being above a threshold, requesting authentication from the user before allowing the user to engage in the activity.

3. The computerized method of claim 1, wherein information received from the wearable device comprises health information about the user.

4. The computerized method of claim 1, further comprising:
   in response to detecting the trigger, requesting biometric authentication from the user before allowing the user to engage in the activity.

5. The computerized method of claim 1, further comprising:
   receiving, from the device associated with the user, a request to register the smart card, wherein the request is triggered by wirelessly detecting the smart card and the request comprises a credential associated with the smart card sent to the device via a wireless protocol.

6. The computerized method of claim 1, wherein the smart card is embedded in a payment card, wherein registering the smart card activates the payment card for purchases and activates the smart card for use as an authentication device.

7. The computerized method of claim 1, wherein the smart card communicates with the device using near-field communication.

8. A system comprising:
   one or more processors; and
   one or more memories storing instructions that, when executed by the one or more processors, cause the system to perform a process comprising:
      receiving, via an application installed on a device associated with a user, a request to engage in an activity;
      after receiving the request, initiating, by a process, a random authentication check;
      detecting, during the initiated random authentication check, a trigger based on one or more parameters of the activity being outside of a normal range for the user, wherein the trigger is detected using information received from a wearable device associated with the user, and the detected trigger causes a possession check for possession of a smart card associated with a user profile;
      in response to detecting the trigger, prompting the user to place the smart card within a threshold proximity of the device; and
      in response to the smart card being detected within the threshold proximity of the device, allowing the user to engage in the activity.

9. The system according to claim 8, wherein the process further comprises:
   determining a level of authentication required for the activity; and in response to the level of authentication required for the activity being above a threshold, requesting authentication from the user before allowing the user to engage in the activity.

10. The system according to claim 8, wherein information received from the wearable device comprises health information about the user.

11. The system according to claim 8, wherein the process further comprises:
in response to detecting the trigger, requesting biometric authentication from the user before allowing the user to engage in the activity.

12. The system according to claim 8, wherein the process further comprises:
receiving, from the device associated with the user, a request to register the smart card, wherein the request is triggered by wirelessly detecting the smart card and the request comprises a credential associated with the smart card sent to the device via a wireless protocol.

13. The system according to claim 8, wherein the smart card is embedded in a payment card, wherein registering the smart card activates the payment card for purchases and activates the smart card for use as an authentication device.

14. A non-transitory computer-readable medium storing instructions that, when executed by a computing system, cause the computing system to perform operations comprising:
receiving, via an application installed on a device associated with a user, a request to engage in an activity;
after receiving the request, initiating, by a process, a random authentication check;
detecting, during the initiated random authentication check, a trigger based on one or more parameters of the activity being outside of a normal range for the user, wherein the trigger is detected using information received from a wearable device associated with the user, and the detected trigger causes a possession check for possession of a smart card associated with a user profile;
in response to detecting the trigger, prompting the user to place the smart card within a threshold proximity of the device; and
in response to the smart card being detected within the threshold proximity of the device, allowing the user to engage in the activity.

15. The non-transitory computer-readable medium of claim 14, wherein the operations further comprise:
determining a level of authentication required for the activity; and
in response to the level of authentication required for the activity being above a threshold, requesting authentication from the user before allowing the user to engage in the activity.

16. The non-transitory computer-readable medium of claim 14, wherein information received from the wearable device comprises health information about the user.

17. The non-transitory computer-readable medium of claim 14, wherein the operations further comprise:
in response to detecting the trigger, requesting biometric authentication from the user before allowing the user to engage in the activity.

18. The non-transitory computer-readable medium of claim 15, wherein the operations further comprise:
receiving, from the device associated with the user, a request to register the smart card, wherein the request is triggered by wirelessly detecting the smart card and the request comprises a credential associated with the smart card sent to the device via a wireless protocol.

19. The non-transitory computer-readable medium of claim 14, wherein the smart card is embedded in a payment card, wherein registering the smart card activates the payment card for purchases and activates the smart card for use as an authentication device.

20. The computerized method of claim 5, further comprising:
in response to the smart card being detected within the threshold proximity of the device, receiving verification information associated with the smart card, wherein the verification information is verified using the credential prior to allowing the user to engage in the activity.

* * * * *